(12) United States Patent
Pfadler et al.

(10) Patent No.: US 11,755,010 B2
(45) Date of Patent: Sep. 12, 2023

(54) AUTOMATIC VEHICLE AND METHOD FOR OPERATING THE SAME

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE); Israel Gonzalez Vazquez, Wolfsburg (DE)

(73) Assignee: Volkswagen Aktiengesellschaft

( * ) Notice: Subject to any disclaimer, the term of this patent is extended or adjusted under 35 U.S.C. 154(b) by 233 days.

(21) Appl. No.: 17/188,459

(22) Filed: Mar. 1, 2021

(65) Prior Publication Data
US 2021/0271239 A1 Sep. 2, 2021

(30) Foreign Application Priority Data
Feb. 27, 2020 (EP) .................................. 20159758

(51) Int. Cl.
*G05D 1/00* (2006.01)
*G05D 1/02* (2020.01)

(52) U.S. Cl.
CPC ......... *G05D 1/0038* (2013.01); *G05D 1/0022* (2013.01); *G05D 1/0061* (2013.01); *G05D 1/0214* (2013.01); *G05D 2201/0213* (2013.01)

(58) Field of Classification Search
CPC .. G05D 1/0038; G05D 1/0022; G05D 1/0061; G05D 1/0214; G05D 2201/0213; G05D 1/0011; G05D 1/0088; G05D 1/0212; G08G 1/096725; G08G 1/096716; G08G 1/096775; G08G 1/096791; G08G 1/096811; G08G 1/162; B60W 60/0015;
(Continued)

(56) References Cited

U.S. PATENT DOCUMENTS 9,494,935 B2 11/2016 Okumura et al.
10,807,591 B1 * 10/2020 Kentley-Klay ........ G08B 21/10
(Continued)

FOREIGN PATENT DOCUMENTS

DE 102015118489 A1 5/2016
DE 102016225606 A1 6/2018
(Continued)

OTHER PUBLICATIONS

Search Report for European Patent Application No. 20159758.0; dated Aug. 11, 2020.
(Continued)

*Primary Examiner* — Rodney A Butler
(74) *Attorney, Agent, or Firm* — BARNES & THORNBURG, LLP

(57) ABSTRACT

A method of automatically driven transportation vehicles (AV) that are tele-operated driving (TOD) in cases when the AV is not able to solve a situation due to unclear traffic conditions. Because TOD sessions arise from special, unclear and relatively rare circumstances and apply measures which go against normal traffic rules or normal behaviour expected from an AV, based on the solution, a transportation vehicle informs other AV's in the vicinity of the TOD session. Other transportation vehicles use the information on the TOD session to aid their situational awareness and driving.

23 Claims, 7 Drawing Sheets

(58) Field of Classification Search
CPC ....... B60W 2554/20; B60W 2554/402; B60W 60/001; B60W 40/04; B60W 40/08; B60W 2050/0064; B60W 2556/45
See application file for complete search history.

(56) References Cited

U.S. PATENT DOCUMENTS

| | | | |
|---|---|---|---|
| 2017/0045885 A1 | 2/2017 | Okumura et al. | |
| 2018/0095457 A1 | 4/2018 | Lee et al. | |
| 2018/0136651 A1* | 5/2018 | Levinson | B60W 30/00 |
| 2019/0196465 A1 | 6/2019 | Hummelshøj | |
| 2019/0320328 A1 | 10/2019 | Magzimof et al. | |
| 2020/0117190 A1 | 4/2020 | Schmitt et al. | |
| 2020/0379457 A1* | 12/2020 | Ostafew | G05D 1/0061 |

FOREIGN PATENT DOCUMENTS

| | | |
|---|---|---|
| DE | 102018112513 A1 | 11/2019 |
| EP | 3333662 A1 | 6/2018 |
| KR | 20180036267 A | 4/2018 |
| WO | 2019180700 A1 | 9/2019 |

OTHER PUBLICATIONS

Search Report; Korean Patent Application No. 10-2021-0025886; dated Oct. 24, 2022.
Written Opinion; Korean Patent Application No. 10-2021-0025886; dated Dec. 15, 2022.

* cited by examiner

AUTOMATIC VEHICLE AND METHOD FOR OPERATING THE SAME

PRIORITY CLAIM

This patent application claims priority to European Patent Application No. 20159758.0, filed 27 Feb. 2020, the disclosure of which is incorporated herein by reference in its entirety.

SUMMARY

Illustrative embodiments relate to an automatic transportation vehicle and method for operating the same. In particular, illustrative embodiments relate to a method of an automatically driven transportation vehicle, AV, in a case when the AV is not able to solve a traffic situation by automatic driving.

BRIEF DESCRIPTION OF THE DRAWINGS

Disclosed embodiments are described below with reference to the drawings, in which.

DETAILED DESCRIPTION

Figure 1:
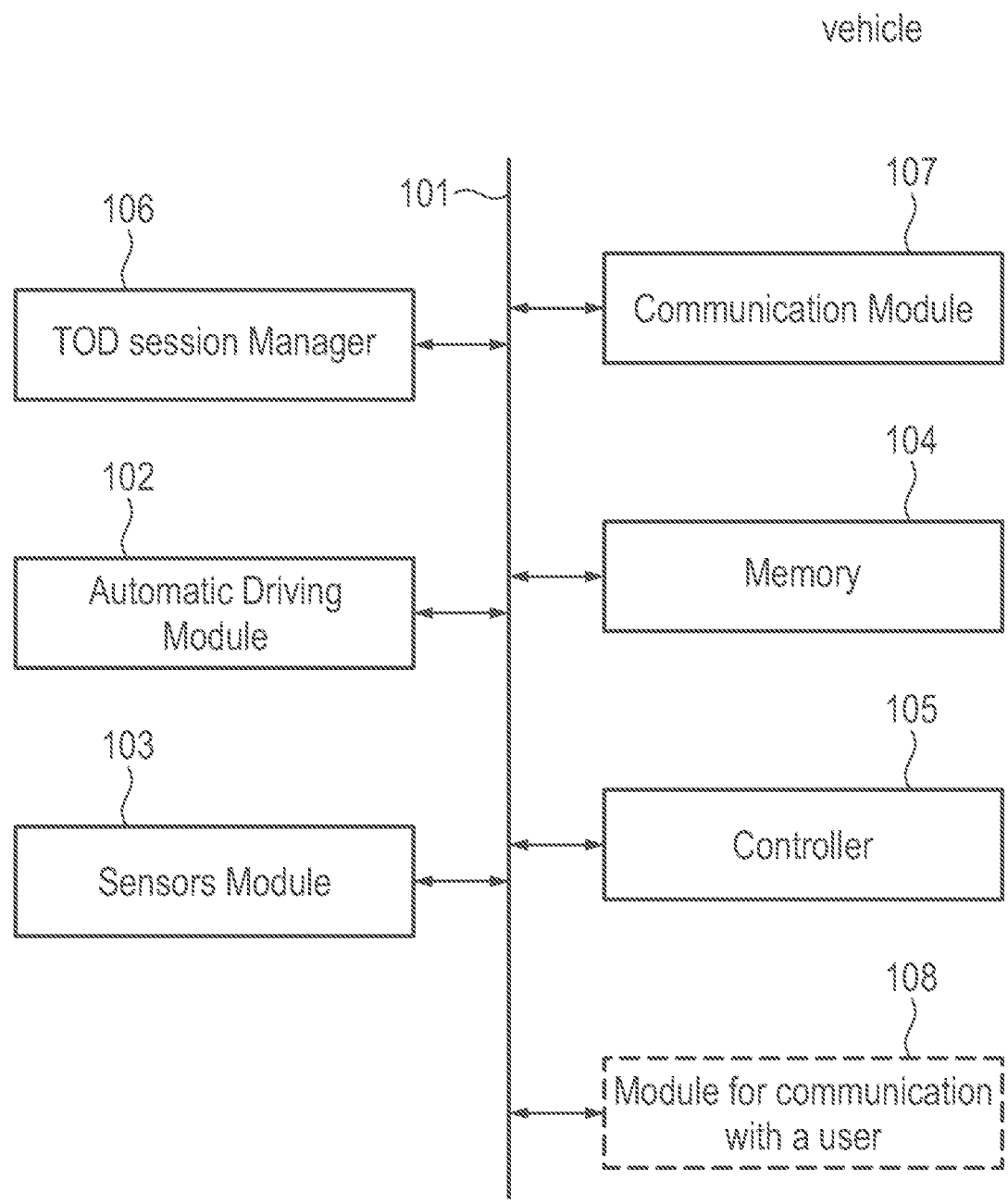
FIG. 1 presents a diagram of the disclosed automatic transportation vehicle system.

Prior art defines a self-driving car, also known as an AV, an automatic transportation vehicle, a driverless car, a robocar, or a robotic car, which is a transportation vehicle that is capable of sensing its environment and moving safely with little or no human input.

Self-driving cars combine a variety of sensors to perceive their surroundings, such as radar, lidar, sonar, GPS, odometry and inertial measurement units. Advanced control systems interpret information obtained from sensors to identify appropriate navigation paths, as well as obstacles and relevant signage.

Further, automotive applications and mobile communications become more and more entangled, particularly due to the increasing interest in automatic driving that requires larger amounts of data when compared to conventional driving. These data amounts are provided partially by the transportation vehicle itself (i.e., by sensors thereof) and partially via an air interface. Via the air interface such as a vehicle to vehicle, V2V, communication or a vehicle to infrastructure, V2I, communication or a vehicle to everything, V2X, communication is carried out, the latter including communication with road side units, RSUs.

Where V2X communication is carried out via a cellular mobile network, such as, e.g., an LTE or 5G communication network, it is referred to as cellular-V2X, C-V2X. The V2V and C-V2X communications can be carried out in a LTE or 5G network with sidelink carries at the PHY layer (PC5 sidelink) or based on WLAN communication according to IEEE 802.11p standard.

An AVs classification system with six levels 0-5, ranging from fully manual to fully automated systems, was published in 2014 by SAE International, an automotive standardization body, as J3016, Taxonomy and Definitions for Terms Related to On-Road Motor Vehicle Automated Driving Systems.

SAE Level 4 ("mind off"): is based on SAE level 3 (as each higher level builds on a lower-ranking level regarding the automatic driving capabilities), wherein no driver attention is ever required for safety, e.g., the driver may safely go to sleep or leave the driver's seat. Self-driving is supported only in limited spatial areas (geofenced) or under special circumstances. Outside of these areas or circumstances, the transportation vehicle must be able to safely abort the trip, e.g., park the car, if the driver does not retake control.

SAE Level 5 ("steering wheel optional"): is based on SAE level 4 but no human intervention is required at all. An example would be a robotic taxi. At SAE Level 5 the automated system will never need to ask for an intervention.

It is known from prior art to use a tele-operated driving, TOD, operation in situations which cannot be safely handled by an AV automatically to enable the AV to solve the traffic/road situation. However, during the TOD session the AV is controlled remotely and might behave in an unconventional manner, e.g., driving on the side walk or otherwise against normal traffic regulations. Hence, during TOD sessions there exists an increased risk of collisions with other transportation vehicles.

It is thus an objective of the present disclosure to overcome or at least reduce the drawbacks of the prior art and to present an improved method for tele-operated driving of an automatic transportation vehicle that allows for decreasing a risk of collisions with other transportation vehicles.

A first facet of the present disclosure relates to a method for operating an automatic transportation vehicle (AV). Therein, the method comprises the operation of determining that a TOD operation of the AV is required for operating the AV in a current traffic condition. When the AV determines that the TOD operation is required, the method of the present disclosure further comprises the operations of transmitting a TOD message to at least one other receiver in the vicinity, the TOD message comprising information that a TOD operation is required by the AV. The receiver may be part of another transportation vehicle, e.g., a communication module of another transportation vehicle. However, the receiver may also be part of a mobile device, such as, e.g., a smartphone. By receiving the TOD message the receiver is aware of that the AV requires a TOD operation. Hence, based on receiving the TOD message, measures can be taken in consideration that the AV might behave in an unconventional manner and even might violate traffic rules, e.g., by crossing a pedestrian walk or the like.

In a disclosed embodiment of the present disclosure, the method further comprises the operations of determining, by the AV, a traffic condition in a vicinity of the AV based on at least one detected environmental signal representative of the vicinity of the AV. In other words, the AV uses at least one sensor, such as, e.g., a LIDAR, a camera, or the like, to detect signals representative of its surroundings. In such way, the AV can obtain information on moving and still objects in its surroundings and can determine a traffic condition based on these information. Therein, a traffic condition may be, e.g., determined by another car, a tree or debris blocking the road.

In this disclosed embodiment, the method further comprises the operations of determining that an operation of the AV by an automatic driving module of the AV is prohibited in the determined traffic condition and the TOD operation is required. Exemplarily, the AV might use the determined traffic situation as an input for the automatic driving module and the automatic driving module may determine an error or that it is not capable of operating the AV in such traffic situation. Such determination might, e.g., be based on boundary conditions reflecting the traffic rules and or a preferred operation of the AV, such as, e.g., to not go over the pedestrian walk. In other words, when the automatic driving module determines that an automatic operation of the AV would require to cross the pedestrian walk, the AV determines that an operation of the AV by an automatic driving module of the AV is prohibited and that the TOD operation is required and transmits the TOD message.

In other words, abnormal conditions may be called boundary conditions or restrictions such that when an AV reaches such boundary conditions, automatic/autonomous driving is not feasible (usually prohibited due to safety reasons) and therefore a TOD session is required.

Optionally, the method further comprises the operations of: transmitting a TOD request message to a control center for requesting a TOD operation based on determining that a TOD operation is required, wherein the TOD request message comprises information on the current traffic condition. Further, the TOD request message may comprise an identification of a reason for the required TOD session as analysed by the AV itself. Thereby the control center will know the current traffic condition causing the TOD operation. In other words, this identification explains why the transportation vehicle considers the current situation as requiring a TOD session.

Optionally, the method further comprises the operations of: initiating a TOD session with the control center; allowing the control center to control the AV; receiving from the control center further data on the current traffic condition; and based on the further data, updating the TOD message transmitted by the AV to other receivers. Favourably, at this stage, the control center typically identifies itself back to the AV. In an exemplary embodiment, the further data on the current traffic condition may be a definition obtained from the control center's human identifying the current traffic condition by examining audio/video signals received from the AV and informing the AV about the reason for the needed support, e.g., a truck blocking the street. Therefore, the further data provides more information (feedback) on the road condition initially identified by the AV. In some case, the reason given by the may further data may differ from the reason given by the AV itself.

Optionally, the updating the TOD message comprises adding information on at least one manoeuvre that allows the AV to arrive in a state wherein an operation of the AV by an automatic driving module of the AV is feasible. To this end a TOD message may be updated with information relating to at least one manoeuvre, which may be given explicitly by the control center or inferred from the driving of the AV under control from a control center. This will help other AV's to reuse a possible remedy to the current traffic condition.

Exemplarily, the information on at least one manoeuvre is inferred from the driving of the transportation vehicle under control of the control center. It may be inferred from a final driving/movement path of the AV under control from a control center. As an example, such manoeuvre may not only comprise a direction or a path but other parameters such as speed and/or duration time (for example, so that AVs occupants may be made aware of it).

Optionally, the information on at least one manoeuvre is derived from the further data received from the control center. The further data also may comprise manoeuvring instructions allowing to address the current traffic condition. Optionally, the information on at least one manoeuvre is a driving path. Such a driving path may be used by other AVs finding themselves in the current traffic condition to address the current traffic condition even without an intervention of a control center. As a benefit, initialization of transportation vehicles' own TOD sessions may be avoided when a solution (e.g., a driving path) may be shared between local AVs. Thus, the number of TOD sessions may decrease.

Optionally, the TOD message comprises: a timestamp; an identifier of the AV; and a geolocation of the AV. Such data allow to identify a time and geolocation at which the identified AV encountered a situation requiring a TOD session. In some disclosed embodiments a make/model of the transportation vehicle may be given, optionally with explicitly given transportation vehicle type, dimensions, which may facilitate helping other transportation vehicles determine whether they may easily apply the same at least one manoeuvre for the same road situation.

Optionally, the TOD message further comprises: information indicating whether the AV is in a TOD operation; an identifier of the command center obtained from the further data; and/or an expected duration of the TOD session obtained from the further data. The aforementioned information allows to inform other AVs in the vicinity that a TOD operation is ongoing, for a given AV, and that a particular control center is involved (which is also thereby identified as possibly knowing a way to address the current traffic condition). The expected duration improves awareness of other AV's. This information may be helpful to let other transportation vehicles know when a given TOD session might end and therefore when results of such TOD session may be expected.

Optionally, prior to the transmitting a TOD request message, the method executes the operations of: receiving a TOD message from another AV; extracting, from the TOD message, information on a TOD session of the another AV; and utilizing the extracted information when establishing a TOD session, or adjusting driving of the AV based on the extracted information. To improve awareness of other transportation vehicles they receive TOD messages. Such messages may be received by AVs or non-AVs. In case of AVs this allows to avoid a situation where many AVs are calling (i.e., establishing TOD sessions) one or more control center (s) to address the same problem (which is being or has already been solved or otherwise addressed). To this end the AV may adjusting driving of the AV based on the extracted information or at least utilize the extracted information when establishing a TOD session (so that such session may, for example, last shorter). Optionally, a TOD message is updated also during the TOD session depending on changes to its content.

Another exemplary embodiment concerns a method for operating an automatic transportation vehicle AV, the method comprising the operations of: determining that a tele-operated driving TOD operation of another AV is required by receiving a TOD message from the another AV; and adapting automatic driving operation of the AV and/or outputting a signal to an AV's occupant in response to the determination. This aims at informing occupants about a TOD session and/or adapting automatic driving operation of the AV (i.e., in silent mode without informing any occupant (s)). Optionally, the method further comprises the operations of: extracting, from the TOD message, information on a TOD session of the another AV; utilizing the extracted information when establishing a TOD session and/or when adapting automatic driving operation of the AV. Further exemplary embodiments, e.g., concerning the contents of the received and/or updated TOD message correspond to the embodiments described above for the method of the AV transmitting a TOD message in response to determining that a TOD operation is required.

Disclosed embodiments further concern a computer program comprising program code methods or mechanisms for performing all the operations of the computer-implemented method according to the method disclosed herein when the program is run on a computer.

Additionally, an object of the present disclosure is a computer readable medium storing computer-executable instructions performing all the operations of the computer-implemented method according the method disclosed herein when executed on a computer.

Another exemplary embodiment is an automatic transportation vehicle AV for tele-operated driving, TOD, the AV comprising: a communication module configured for bidirectional communication with a control center; an automatic driving module configured to control the driving of the AV; a TOD session manager configured to determine that a tele-operated driving TOD operation of the AV is required for operating the AV in a current traffic condition; and a controller configured to execute the method disclosed herein.

Optionally, the TOD session is established via a Uu Interface communication, such as, e.g., a message transmitted via a 4G or 5G mobile communication network. Further, the TOD session may be established via a sidelink Interface communication. Optionally, the TOD message is a broadcast message. However, also unicast message can be transmitted as the TOD message in the context of the claimed method. In such disclosed embodiment, the method of the present disclosure may further comprise initializing a communication between the AV and another AV in the vicinity of the AV.

Yet another exemplary embodiment is a control center method for tele-operated driving, the method comprising the operations of: receiving a request for tele-operated driving from a transportation vehicle; establishing a communication session with the transportation vehicle to execute the tele-operated driving session; accepting tele-operation driving instructions from the control center and transmitting the instructions to the transportation vehicle, the method being characterized in that awaits identification of a cause for the tele-operated driving session from the control center and reporting the cause to the transportation vehicle. The identification of the cause on the current traffic condition may be a definition obtained from the control center's human identifying the current traffic condition by examining audio/video signals received from the AV and informing the AV about the reason for the needed support, e.g., a truck blocking the street. Therefore, the further data provides more information (feedback) on the road condition initially identified by the AV. The reason given by the further data may differ from the reason given by the AV itself.

Optionally, the reporting the cause to the transportation vehicle further comprises: an identifier of the control center; and/or an expected duration of the TOD session. The expected duration improves awareness of other AV's. This information may be helpful to let other transportation vehicles know when a given TOD session might end and therefore when results of such TOD session may be expected.

A further exemplary embodiment concerns a control center system for tele-operated driving comprising: a Communication Module configured to establish a bidirectional communication with a transportation vehicle; a tele-operation module configured to communicate with the transportation vehicle to instruct its behaviour; a TOD session Manager configured to establish a tele-operated driving TOD session with the transportation vehicle; a controller, the system being characterized in that the controller is further configured to execute all operations of the control center method.

The various disclosed embodiments mentioned in this application can be combined with one another, unless otherwise stated in the individual case.

Some portions of the detailed description which follows are presented in terms of data processing procedures or other symbolic representations of operations on data bits that can be performed on computer memory. Therefore, a computer executes such logical operations thus requiring physical manipulations of physical quantities.

Usually these quantities are electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

As used herein, the term "and/or" includes any and all combinations of one or more of the associated listed items. Further, the use of "may" when describing exemplary embodiments refers to "one or more exemplary embodiments." Further, in the following description of exemplary embodiments, the terms of a singular form may include plural forms unless the presented context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items and expressions such as "at least one of" when preceding a list of elements, modify the entire list of elements.

Reference will now be made in detail to exemplary embodiments which are illustrated in the drawings. Effects and features of the exemplary embodiments will be described with reference to the accompanying drawings. Therein, like reference numerals denote like elements, and redundant descriptions are omitted. The present disclosure, however, may be embodied in various different forms, and should not be construed as being limited to only the illustrated embodiments herein. Rather, these exemplary embodiments are provided solely as examples for fully conveying the facets and features of the present disclosure to those skilled in the art.

According to the disclosed embodiments, under unclear road circumstances an AV needs external support to overcome such unclear/unexpected situations. Support may be given by a so-called command center (CC) or also referred as a remote operator or a control center. The AV is remotely controlled in such cases by commencing a TOD session with the CC. In most cases the AV initiates the TOD session at its own request. During the TOD session the AV is controlled remotely and might behave in a unconventional manner, e.g., driving on the side walk or otherwise against normal traffic regulations, which may, for example, be commanded by a police officer etc.

Because TOD sessions arise from special, unclear and relatively rare circumstances and apply measures, which might go against normal traffic rules (e.g., a traffic control officer directs transportation vehicles onto a cycling path due to the road being blocked), it is beneficial to inform other AV's in the vicinity of the TOD session. Furthermore, other transportation vehicles might use this information, e.g., on a cause which triggered the TOD session, such as a truck blocking the street, to aid their situational awareness and driving-related decisions.

According to the disclosed embodiments, an AV requesting or involved in a TOD session should share this information via direct communication through a TOD message (optionally broadcast but other techniques such as a multicast or unicast may be applied). Either it will be a new broadcast message or it might be contained within an existing vehicular broadcast message systems as, e.g., Cooperative Awareness Message (CAM). Such cooperative awareness is the basis for a large number of Intelligent Transportation Systems where AVs share information.

FIG. 1 presents a diagram of the AV system according to the disclosed embodiments. The system may be present on a transportation vehicle's side, i.e., in the transportation vehicle. The system may be embedded or portable, i.e., controlled by user's devices such as a tablet.

The system may be realized using dedicated components or custom made FPGA or ASIC circuits. The system comprises a data bus 101 communicatively coupled to a memory 104. Additionally, other components of the system are communicatively coupled to the data bus 101 so that they may be managed by a controller 105.

The memory 104 may store system configuration and/or computer program or programs executed by the controller 105 to execute the method (see FIGS. 2-3) according to the disclosed embodiments. Different memory types may be organized under the memory 104 module such as RAM and/or non-volatile FLASH memory.

A Communication Module 107 allows for bidirectional communication with a control center. For example, it may be a 3G, 4G, 5G, Wi-Fi communication or the like. Thus, the AV may communicate with external resources, in particular, with a control center and other transportation vehicles in its vicinity. The communication may be effected over a network such as the internet and/or direct local radio communication such as wireless Vehicle to Vehicle Communication (V2V) or Cellular Vehicle To Everything (C V2X).

The Communication Module 107 also allows for transmitting TOD messages as will be later defined with reference to FIG. 4, in particular.

In some cases, different communication technologies may be supported in parallel by the Communication Module 107. For example, one communication link type for local communication with other transportation vehicles (e.g., transmission of TOD messages) and another communication link type for communication with control centers.

An Automatic Driving Module 102 is a generic component comprising all logical and physical devices responsible for control of the automatic transportation vehicle. It is clear to a person skilled in the art that such a module controls, for example, acceleration, steering, braking and similar movement-related actions based on readings from corresponding sensors 103. One or more sensors 103 (may also be referred to as environmental sensors) may also detect traffic signals, for example, by capturing images of traffic lights, markings on road surfaces such as traffic lanes or turn signs, or traffic signs or the like.

The sensors 103 may include geolocation sensors, proximity sensors, one or more camera and any other sensor typically associated with automatic and tele-operated driving as will be evident to a person skilled in the art. Non-limiting examples of sensors 103 may be selected from a group comprising accelerometers, gyroscopes, magnetometers, optical sensors, image capturing sensors and radar sensors.

Optionally, the transportation vehicle systems may comprise a Module for communication with a user 108 that can allow the driver to communicate with the system and/or the control center. Such methods or mechanisms for communication may be audio and/or video communication methods or mechanisms. A driver will typically communicate with a human operator managing a TOD session at the control center.

Typically, three modes of operation are present in modern AVs: manual mode, automatic mode and tele-operated mode. However, sometimes the manual mode may be omitted as on SAE Level 5.

A TOD session Manager 106 is configured to determine an unexpected or unclear traffic condition (such condition may also be called an abnormal or a predefined condition), which may be reported internally (see FIG. 2) by the Automatic Driving Module 102 reaching a condition, which is determined (based on predefined conditions) as requiring tele-operated driving. Examples of such predefined conditions may include hazardous conditions such as heavy fog, a fallen tree blocking a road or a flooded section of a road due to a heavy rainfall, which make automatic driving not feasible (i.e., prohibited or disallowed to be automatic in these conditions). In other words, such predefined or abnormal conditions may be called boundary conditions or restrictions such that when an AV reaches such boundary conditions, automatic/autonomous driving is not feasible (usually prohibited due to safety reasons) and therefore a TOD session is required.

In view of the above, operation of the AV by an automatic driving module 102 of the AV is prohibited in the determined traffic condition and the TOD operation is required.

It will be evident to a person skilled in the art that determining that such condition has occurred may be subject to different analyses of transportation vehicle's environment and is beyond the scope of the present disclosure. Alternatively, an unexpected condition may be reported from external sources (see FIG. 3) such as other transportation vehicles in the vicinity of the AV.

When an unexpected or unclear traffic condition occurs, the TOD session Manager 106 may be further configured to establish a tele-operation session with a control center. This is done using the Communication Module 107.

Figure 2:
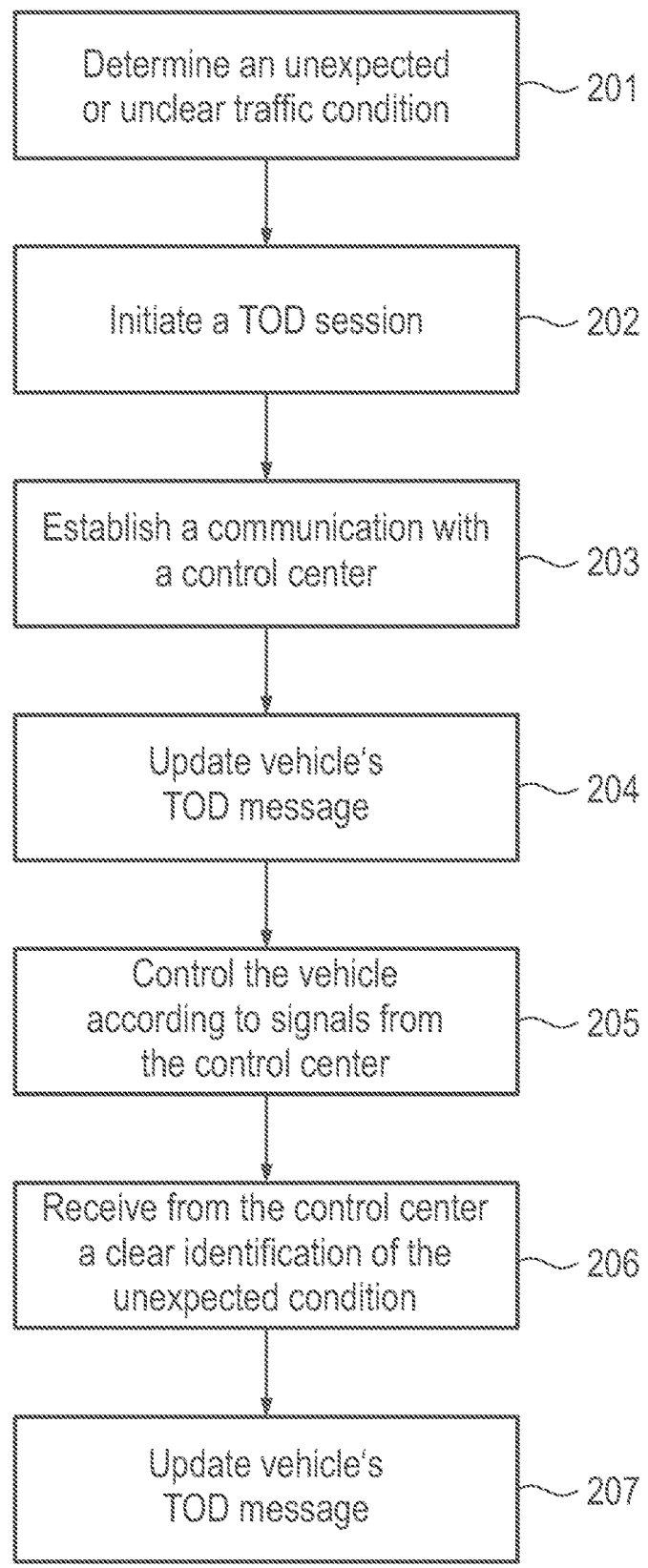
FIG. 2 presents a diagram of the transportation vehicle's method when a cause of an unclear situation is detected internally.

FIG. 2 presents a diagram of the disclosed transportation vehicle method when a cause of an unclear situation is detected internally. It is clear that at different stages of this process, the AV may update its TOD message as will be evident from the examples given below.

The method starts at operation at 201 from determining an unexpected or unclear traffic condition. For example, a truck is blocking a one way road and the AV stops behind the truck while establishing that current situation is unclear.

Subsequently, at operation at 202, the transportation vehicle's system initiates a TOD session first by transmitting a TOD request message. The TOD request message may comprise an identification of a reason for the required TOD session as analyzed by the AV itself, i.e., by the Automatic Driving Module 102.

For example, the transportation vehicle calls the CC via Uu link (Uu Interface communication, usually long range which links User Equipment to the UMTS Terrestrial Radio Access Network) and is also broadcasting via a sidelink (usually short range wireless communication) that it requires remote assistance.

Examples of Sidelink communication standards are: PC5 for cellular based communication or Dedicated Short Range Communication (DSRC) based on WiFi standard 802.11p.

According to an example, the Uu link is used for a communication with a command center (and remote control: in uplink video data and downlink control data) and a sidelink for the TOD message to inform the environment about a TOD session.

Thereby, the AV establishes a communication with the control center at operation at 203. At this stage, the control center typically identifies itself back to the AV.

Next, at operation at 204, the transportation vehicle may already optionally update its broadcast message (or more generally a TOD message) by identifying that it has established a TOD session or awaits the TOD session to be established.

In an exemplary embodiment such broadcast message may even be updated (or generated for a first time) after the AV has requested a TOD session and prior to actually initiating 202 or establishing 203 the TOD session with a control center. In this manner other AVs in the vicinity may already become aware about a request for a TOD even before the TOD session is actually requested or begins.

Further, at operation at 205, the process allows the control center to remotely control the automatic transportation vehicle, for example, the control center operator guides the transportation vehicle to a sidewalk or to a non-tarmac side of the road (e.g., a lawn). In another exemplary embodiment, this operation is optional as a TOD session might be established just for obtaining information (or otherwise instructions or approval of suggested automatic behaviour) and not requiring actual control of the AV (in terms of real-time manoeuvring).

At operation at 206, the transportation vehicle is configured to receive from the control center an enhanced identification (the enhanced identification may otherwise be referred to as further information on (the identification of a reason for the required TOD session)) of the unexpected condition, e.g., the control center's human operator identifies a condition by examining audio/video signals received from the AV and informs the AV about the reason for the needed support, e.g., a truck blocking the street.

The enhanced identification provides more information on the road condition initially identified by the AV (at operations at 201-202), which caused the TOD session. Such enhanced identification may be a human-made description or automatic classification based, for example, on photograph(s)/video(s) or human-made classification selecting one or more predefined classes of road conditions.

Subsequently, based on information obtained at operation at 206, the transportation vehicle is updating 207 its broadcast message so that other transportation vehicles may learn more information regarding the unexpected condition.

Optionally, the update of the broadcast message may comprise a solution (or partial solution) to solve the deadlock situation. The solution may be a proposed movement path (as well as other movement parameters) to arrive at an AV state allowing driving without a need of tele-operated control.

In more general terms, the solution may be an identification of at least one action or manoeuvre allowing the AV to arrive at/in a state allowing driving without a need of a tele-operated control i.e., allowing automatic driving. The solution may, for example, be inferred from the driving of the AV under control from a control center (e.g., a final driving/movement path). Such solution may not only comprise the path but other parameters such as speed and/or duration time (for example, so that AVs occupants may be made aware of it).

Figure 3:
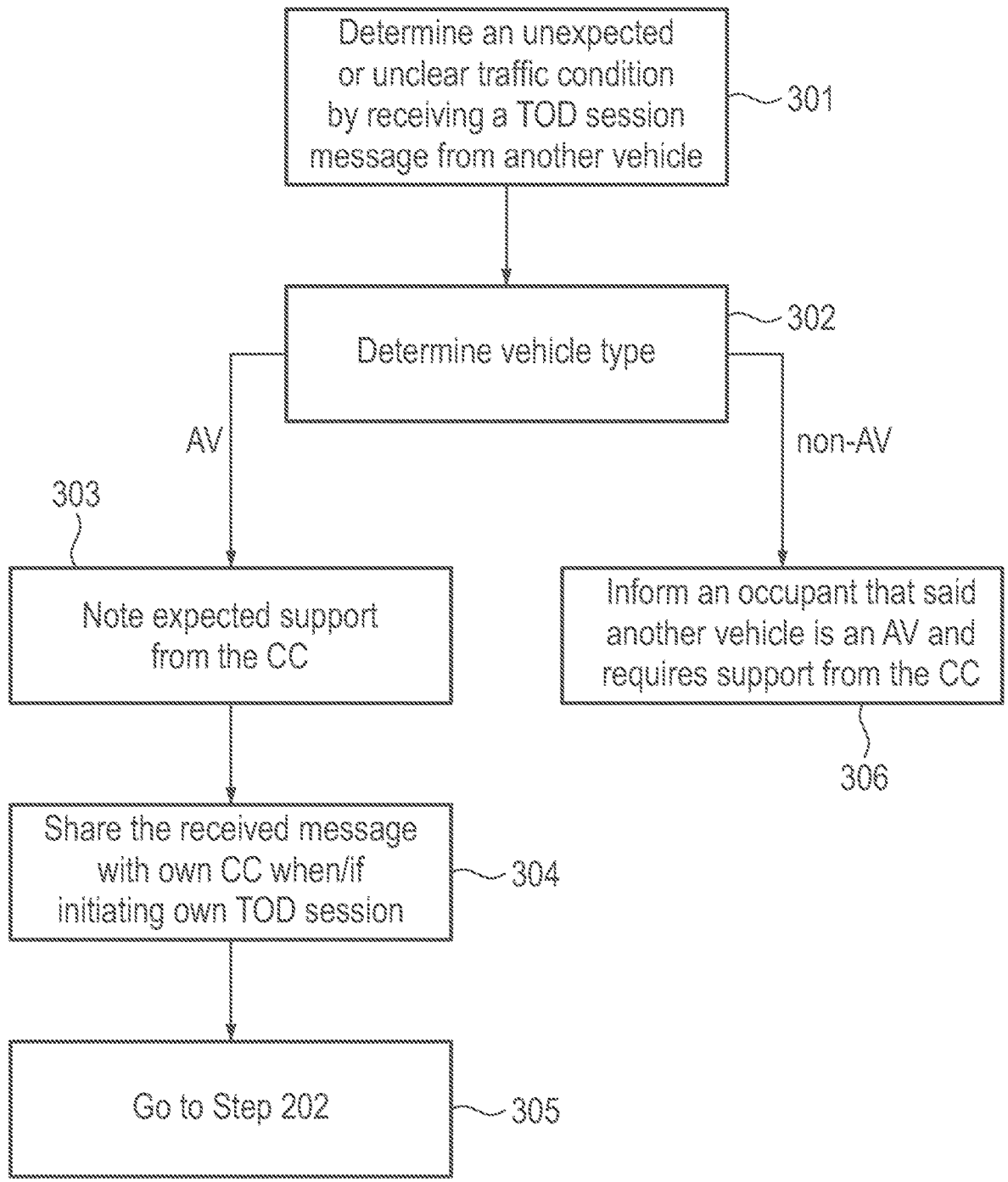
FIG. 3 presents a diagram of the transportation vehicle's method when a cause of an unclear situation is detected externally.

FIG. 3 presents a diagram of the disclosed control center system when a cause of an unclear situation is detected externally. The method starts at operation at 301 from determining an unexpected or unclear traffic condition by receiving a TOD message from another transportation vehicle (or in general another transportation vehicle's broadcast message). More details of such message will be provided with reference to FIG. 4.

Subsequently, at operation at 302, the process verifies whether the current transportation vehicle is an AV or non-AV. In case the current transportation vehicle is an AV, the process moves to operation at 303 where the transportation vehicle notes expected support from a control center at a given location, optionally given by the message received at operation at 301. Already at this stage the AV may adjust its driving based on the extracted information from the received TOD message. Such adjusting may, for example, include increasing alert level, decreasing speed or driving to a safe geolocation.

Next, at operation at 304, when or if the transportation vehicle decides to establish its own session with a control center, it may share the received TOD message with its control center when initiating an own TOD session. Frequently, such unexpected or unclear traffic condition will have been addressed by a different control center than the control center of the AV's own TOD session. Such information may be shared within a given control center or among different control centers (even if not explicitly shared with AVs).

Optionally, at least a portion of the received message (301) may be shared as, for example, some data fields are empty or considered not relevant in a current situation of a particular AV.

To initiate the own TOD session, the process goes to operation at 202. Therefore, operations at 302, 303 are executed prior to operation at 202.

Alternatively, when at operation at 302 it is established that the current transportation vehicle is a non-AV then at operation at 306 the transportation vehicle may inform a driver (or an occupant in general) that the another transportation vehicle is an AV and requires support from the control center. Optionally, the transportation vehicle may display geolocation of the reported TOD session of the other transportation vehicle.

It is clear to a person skilled in the art that at least parts of the disclosed methods and, in particular, the methods of FIGS. 2-3, may be computer implemented. Accordingly, the present disclosures may be an entirely hardware embodiment, an entirely software embodiment (including firmware, resident software, micro-code, etc.) or an embodiment combining software and hardware facets that may all generally be referred to herein as a "circuit", "module" or "system".

Furthermore, the disclosed embodiments may be a computer program product embodied in any tangible medium of expression having computer usable program code embodied in the medium.

It can be easily recognized, by one skilled in the art, that the aforementioned method for operating an automatic transportation vehicle may be performed and/or controlled by one or more computer programs. Such computer programs are typically executed by utilizing the computing resources in a computing device. Applications are stored on a non-transitory medium. An example of a non-transitory medium is a non-volatile memory, for example, a flash memory while an example of a volatile memory is RAM. The computer instructions are executed by a suitable processor. These memories are exemplary recording media for storing computer programs comprising computer-executable instructions performing all the operations of the computer-implemented method according the technical concept presented herein.

Figure 4:
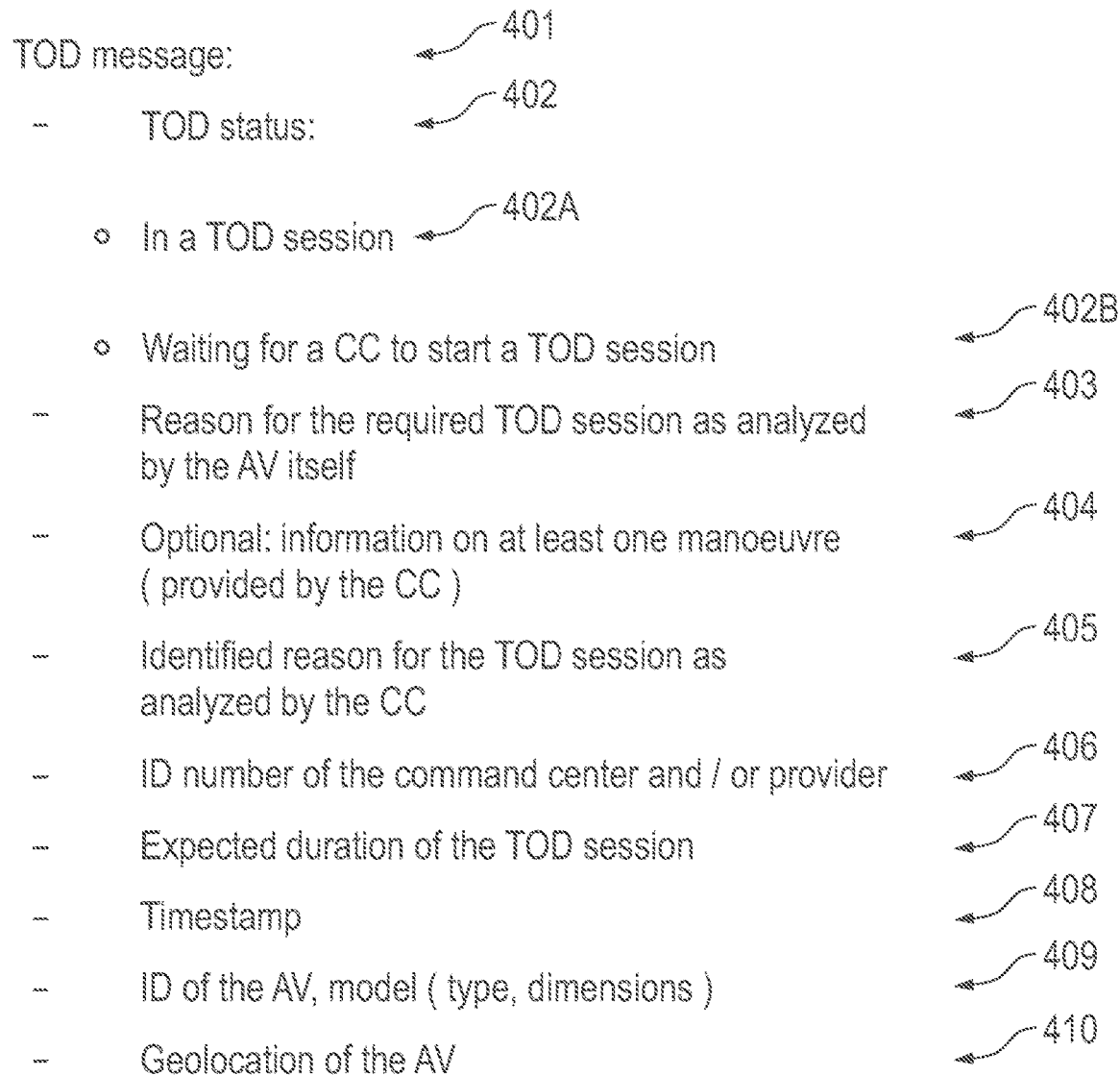
FIG. 4 presents an example of a TOD session message.

FIG. 4 presents an example of a TOD message. Such a message 401 may be generated and broadcast by each AV and periodically updated depending on changes of situation of the automatic transportation vehicle concerned.

It is clear to one skilled in the art, that depending on particular implementation requirements the respective data fields of the TOD message 401 may have different names and different data formats and the examples of data formats given below are only non-limiting preferred options while focusing on the meaning of the data rather than particular names or formats of the variables.

A preferred TOD (broadcast) message 401 comprises a TOD status subsection 402 listing two variables.

The first variable 402A may be called 'In TOD session' and identifies, optionally as a Boolean true/false, whether the current transportation vehicle is currently under tele-operation by a control center.

The second variable 402B may be called 'Waiting for CC to start TOD session' and identifies, optionally as a Boolean true/false, whether the identified transportation vehicle is currently awaiting for tele-operation session from a control center CC (i.e., a request has been sent for a TOD session but such session has not yet commenced, for example, due to a queue of waiting TOD requests at a given control center).

The next optional field in the TOD message 401 may be a textual field 403 describing a reason for the required TOD session as analyzed by the transportation vehicle itself, e.g., truck is blocking the street. In other words the field 403 is information on identification of the current traffic condition 403. In other disclosed embodiments, this field may identify one or more of standard reasons (for example, defined by a look-up table) by an identifier, e.g., identifier '17' denotes an accident. In other words, this field identifies why the transportation vehicle considers the current situation as requiring a TOD session.

A further optional field 404 identifies a solution provided by the control center, e.g., a proposed movement path given from the control center's operator. As already explained, in general terms, the aforementioned solution may be an identification of at least one action or manoeuvre allowing to arrive at/in an AV state allowing further driving without a need of a tele-operated control (in other words an AV state allowing automatic driving).

The next field 405 identifies a reason for the TOD session as analyzed and established by the control center. This reason may differ from the reason given by the aforementioned 403 field.

The following field 406 defines an identification (ID) number of the command center and/or provider. As there may be different control centres this field allows to associate a given TOD session with a particular control center. Optionally, an identifier of a particular human operator may be also given.

Optionally, a further field 407 provides an expected duration of the TOD session. This information may be helpful to let other transportation vehicles know when a given TOD session might end and therefore when results of such TOD session may be expected, in particular, updated information under fields 404, 405. This duration will typically be given by the control center to the AV.

A further field is a Timestamp 408, which helps other transportation vehicles, receiving AV TOD messages 401, determine whether the TOD messages 401 are current and refer to present or past situations.

Additionally a field 409 identifies the transportation vehicle. In some exemplary embodiments a make/model of the transportation vehicle may be given with explicitly given transportation vehicle type, dimensions, which may facilitate helping other transportation vehicles determine whether they may easily apply the same solution 404 for the same road situation.

Lastly, the message 401 comprises a geolocation (Position) 410 of the transportation vehicle. This is of course key information as it allows other transportation vehicles establish how far they are from the road situation that has caused the TOD session.

It is clear that an AV may update (also more than once) its TOD message 401 also during the TOD session depending on changes to its content. The changes may be made by the control center, for example, by specifying further information related to the ongoing TOD session.

The received TOD message 401 can be used by other transportation vehicle(s) to facilitate an initialization of own TOD session(s), by sharing this information with their associated control center CC.

Figure 5:
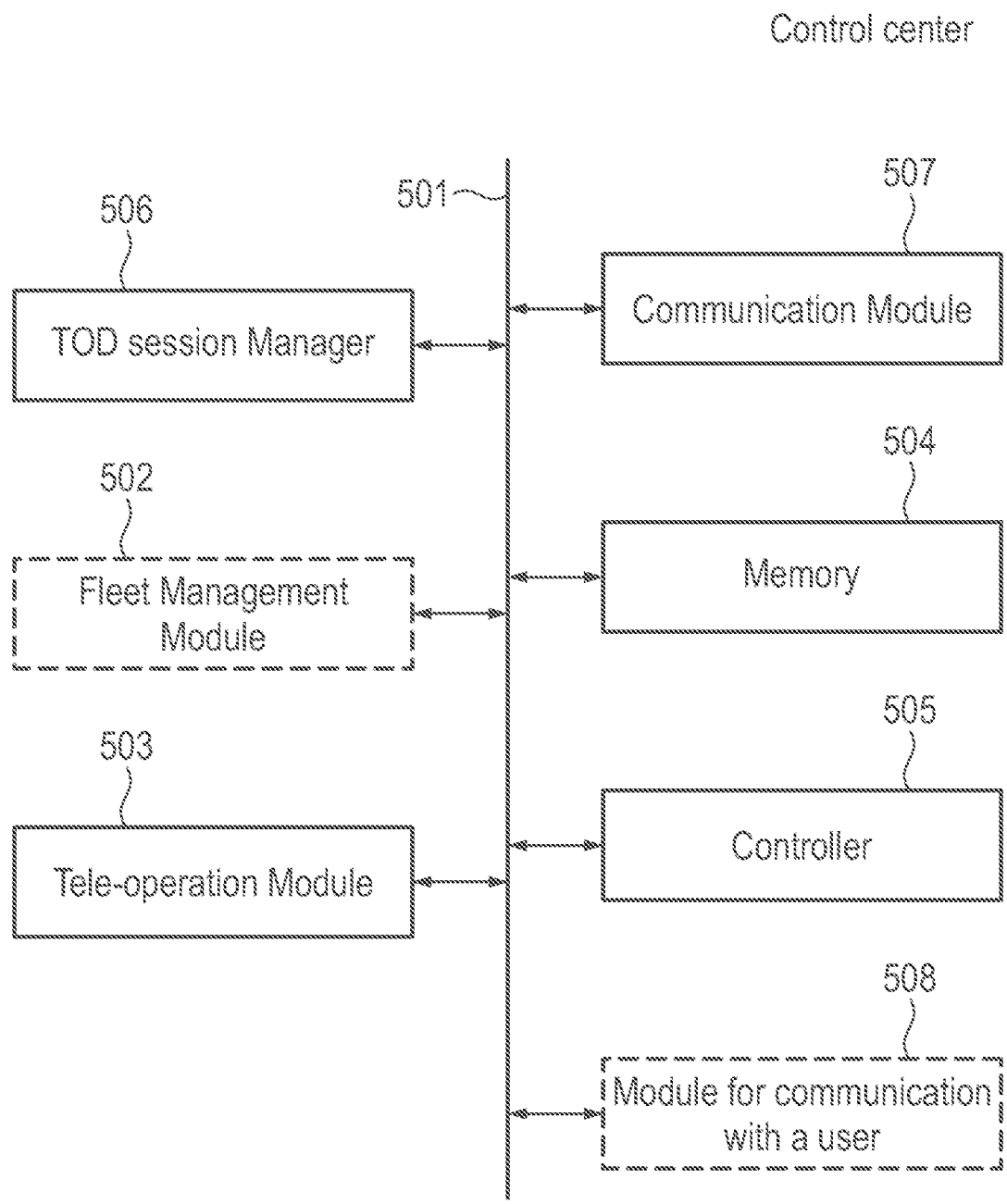
FIG. 5 presents a diagram of the control center system.

FIG. 5 presents a diagram of the disclosed control center system. The system may be realized using dedicated components or custom made FPGA or ASIC circuits. The system comprises a data bus 501 communicatively coupled to a memory 504. Additionally, other components of the system are communicatively coupled to the system bus 501 so that they may be managed by a controller 505.

Figure 6:
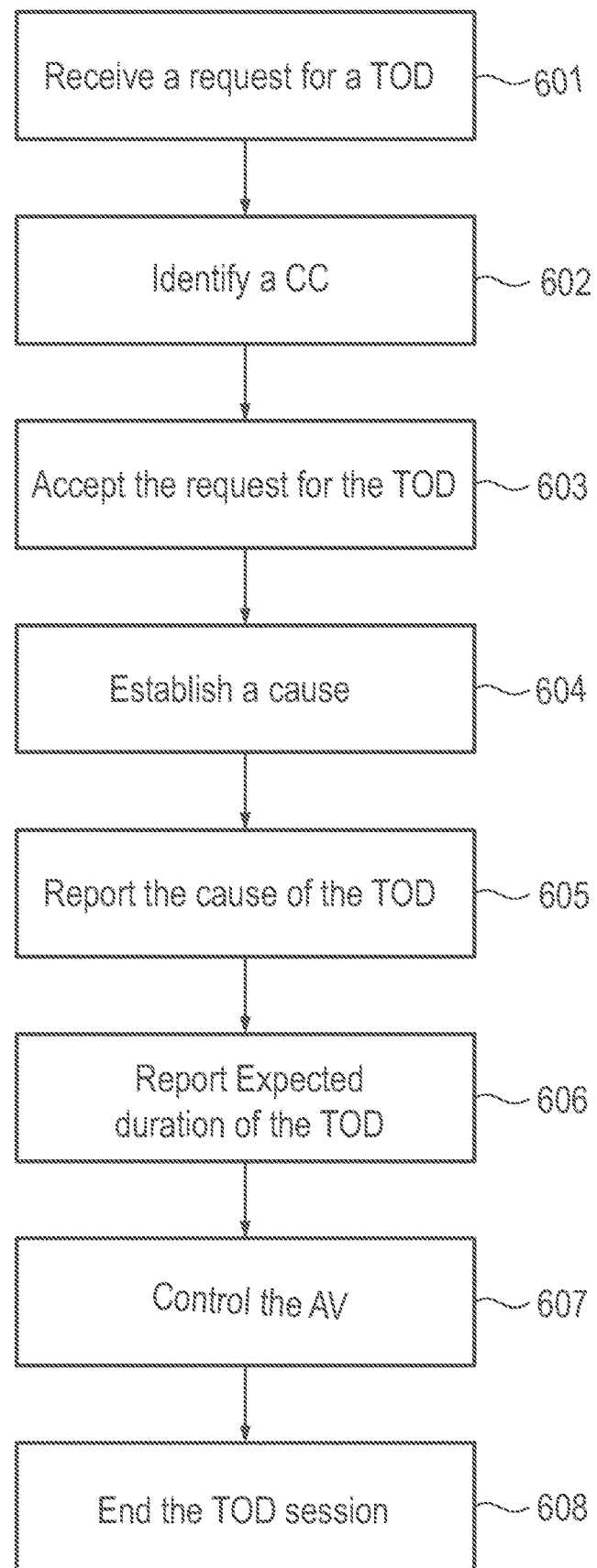
FIG. 6 presents a diagram of the control center method.

The memory 504 may store computer program or programs executed by the controller 505 to execute the method (see FIG. 6). Different memory types may be organized under the memory 504 module such as RAM and/or non-volatile FLASH memory. The memory 504 stores also configuration data such as an identifier of the respective control center 406.

A Communication Module 507 allows for bidirectional communication with an automatic transportation vehicle. For example, it may be a 3G, 4G, 5G communication or the like such as the internet and/or direct local radio communication such as wireless Vehicle to Vehicle Communication (V2V) or Cellular Vehicle To Everything (C V2X).

The system may comprise a Module for communication with a driver 508 that can allow the control center operator to communicate with the driver (sometimes the AV will not carry a driver but rather occupants such as passengers). Such methods or mechanisms for communication may be audio and/or video communication methods or mechanisms. A driver will typically communicate with a human operator managing a TOD session at the control center.

A tele-operation module 503 is configured to communicate with the AV to instruct its behaviour. In a tele-operation mode, the AV can be tele-operated by a human operator present at the control center. In at least one disclosed embodiment, the driver (i.e., the occupant physically within the transportation vehicle), can be prompted to approve tele-operation mode. In another disclosed embodiment, tele-operation mode can be activated without a confirmation by the driver, and can even be executed without the occupant(s) being aware that the AV is not in an automatic mode.

When a human operator from a control center has control of the AV, the operator may directly influence AV systems in real time and be aware of AV sensor's readings in real time.

A TOD session Manager 506 is configured to establish a TOD session with an AV and to provide information to the AV that will be used by the AV as data for fields 404, 405, 406 and 407 of its TOD message 401.

A fleet management module 502 may be optionally present and be configured to manage a set of AVs associated with each other and sharing data messages among themselves. Such module may implement management of transportation vehicle platooning. A platoon is a group of transportation vehicles that can safely travel very closely together. Each transportation vehicle communicates with the other transportation vehicles in the platoon wherein a lead transportation vehicle controls speed and direction of movement, and all following transportation vehicles respond to the lead transportation vehicle's movement. The fleet management module may implement features related to managing such platoons or fleets collectively, e.g., during a TOD session.

FIG. 6 presents a diagram of the disclosed control center method. The method starts at operation at 601 by receiving a request for establishing a TOD session from an AV. Next, at operation at 602, the process identifies the control center and accepts the request for TOD 603 thereby establishing a communication session with the AV to execute the TOD session.

Subsequently, at operation at 604, the method awaits the human operator to identify a cause for the TOD so that it may be reported 605 to the AV. In other words, the system awaits identification of a cause for the tele-operated driving session from the control center. Similarly, at operation at 606, an expected duration of the TOD session may be determined and reported to the AV.

At operation at 607, the control center tele-operates the AV to avoid the unexpected or unclear traffic condition and arrive at a state of the AV where automatic driving may be continued. As already defined, tele-operation may require an explicit authorization from a driver be activated without a confirmation by the driver. In another disclosed embodiment, this operation is optional as a TOD session might be established just for obtaining information by the AV and not requiring actual control of the AV.

Tele-operation is based on data captured by the sensors 103 of the AV and requires specific commands to be send to the AV. Such commands are however beyond the scope of the present disclosure as a person skilled in the art will recognize.

During tele-operation, the expected duration of the TOD session may be determined again and reported to the AV as an update.

When the human operator of the control center finishes tele-operation, the TOD session may be ended at operation at 608.

Similarly, as in case of processes of FIGS. 2-3, it can be easily recognized, by one skilled in the art, that the aforementioned method for tele-operated driving may be performed and/or controlled by one or more computer programs.

Figure 7:
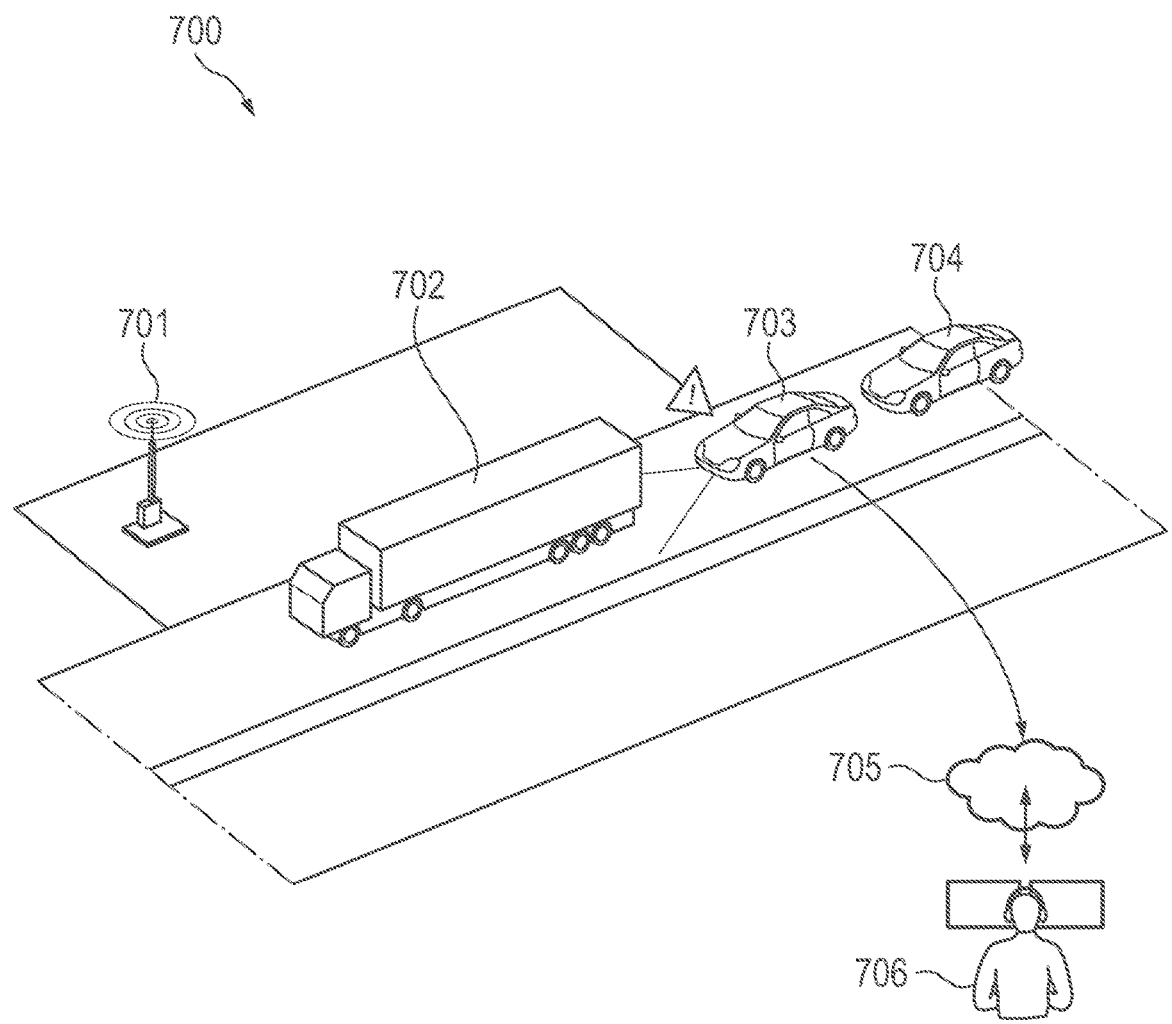
FIG. 7 shows an example of a traffic situation requiring a TOD session.

FIG. 7 shows an example of a traffic situation 700 requiring a TOD session. A first transportation vehicle 703 encounters a traffic situation wherein a truck 702 is blocking a one-way street. Using a communication infrastructure 701 the first transportation vehicle may request 705 a TOD session from a command center 706.

Such session may be established to solve the issue by tele-operated driving. During the TOD session a second transportation vehicle 704 may be notified via a TOD (broadcast) message 401 of the first transportation vehicle 703 that a TOD session is ongoing. Results of such TOD session may also be broadcasted 401 by the first transportation vehicle 703 to other transportation vehicles in proximity/vicinity 704.

As an example the proximity or vicinity may be defined depending on a road type or location. In urban areas it might be up to 500 m or up to 1 km and in the case of high-speed roads the vicinity may extend up to several km (e.g., up to 2 km or up to 3 km).

In view of the foregoing detailed description, a received TOD message 401 can be used by other transportation vehicles 704 (or other receivers in general be it human or non-human, transportation vehicles or non-transportation vehicles such as pedestrian's smartphones, smart watches etc.) to facilitate prior knowledge of a problematic traffic condition.

With an increasing amount of modern transportation vehicles using V2V and V2X communication, the number of users of these communication protocols is on the rise. Due to the user numbers and increasingly complex applications, the amount of transmitted data will rise continuously. However, due to limited bandwidth and data rate the increase in data might result in bottlenecks.

However, particularly with respect to automatic driving, the QoS of the radio links might be directly related to the safety of the automated processes and hence the driver's safety. Hence, limiting data throughput via the radio link is one of the challenges of AV communication such as V2V and V2X.

Owing to some facets of the present disclosure, a situation where many AVs are calling (i.e., establishing TOD sessions) the control center to address the same problem (which is being or has already been solved or otherwise addressed) is avoided.

Another benefit of the present disclosure is avoiding initialization of transportation vehicles' own TOD sessions when a solution may be shared between local AVs. Thus, the number of TOD sessions may decrease.

REFERENCE SIGNS

101 Data bus
102 Automatic Driving Module
103 Sensors
104 Memory
105 Controller
106 TOD session manager
107 Communication Module
108 Module for communication with a user
201-207, 301-306 Method operations
401-410 message content
501 Data bus
502 Fleet Management Module
503 Tele-operation module
504 Memory
505 Controller
506 TOD session Manager
507 Communication Module
508 Module for communication with a driver
601-608 Method operations
700 Traffic situation
701 Communication infrastructure
702 Truck
703 First transportation vehicle
704 Second transportation vehicle
705 Request of a TOD session
706 Command center

The invention claimed is:

1. An Automatic transportation Vehicle (AV) for Tele-Operated Driving (TOD), the AV comprising:
   a communication module for bidirectional communication with a control center;
   an automatic driving module configured to control the driving of the AV;
   a TOD session manager configured to determine whether a tele-operated driving TOD operation of the AV is required for operating the AV in a current traffic condition; and
   a controller configured to:
      in response to determining that TOD operation of the AV is required for operating the AV in a current traffic condition, control the TOD session manager to control the communication module to transmit a TOD message to at least one other receiver in a vicinity of the AV requiring the TOD operation indicating TOD operation is required by the AV in the current traffic condition, wherein the at least one other receiver is a receiver other than the control center,
      wherein the determination of whether TOD operation of the AV is required for operating the AV in the current traffic condition includes determining a traffic condition in a vicinity of the AV based on at least one detected environmental signal representative of the vicinity of the AV, and determining whether operation of the AV by an automatic driving module of the AV is prohibited in the determined traffic condition of the AV vicinity, and
      wherein the controller controls the TOD session manager to extract TOD session information from TOD messages received by the AV for use in establishing a TOD session for the AV, or adjusting driving of the AV based on the extracted information.

2. The AV of claim 1, wherein the controller is further configured to control the AV to:
   control the communication module to transmit a TOD request message to the control center requesting a TOD operation based on determining that a TOD operation is required,
   wherein the TOD request message sent to the control center comprises information about the current traffic condition.

3. The AV of claim 2, wherein the controller is further configured to control the AV to:
   control the TOD session manager to initiate a TOD session with the control center;
   allow the control center to control the AV;
   control the communication module to receive further data from the control center about the current traffic condition; and
   update the TOD message transmitted by the AV to other receivers based on the further data.

4. The AV of claim 3, wherein the updating of the TOD message comprises adding information about at least one maneuver that enables the AV to arrive in a state, wherein an operation of the AV by an automatic driving module of the AV is feasible.

5. The AV of claim 4, wherein the information about the at least one maneuver is inferred from the driving of the AV under control of the control center.

6. The AV of claim 4, wherein the information about the at least one maneuver is derived from the further data received from the control center.

7. The AV of claim 4, wherein the information on at least one maneuver is a driving path.

8. The AV of claim 1, wherein the TOD message comprises a timestamp, an identifier of the AV, and a geolocation of the AV.

9. The AV of claim 3, wherein the TOD message further comprises:
   information indicating whether the AV is in a TOD operation;
   an identifier of the control center obtained from the further data; and/or
   an expected duration of the TOD session obtained from the further data.

10. The AV of claim 2, wherein prior to the transmission of TOD request messages, a TOD message is received from another AV, the TOD session information is extracted from the received TOD message, and the extracted information is used to establish the TOD session for the AV, or adjust driving of the AV based on the extracted information.

11. A method for operating an Automatic transportation Vehicle (AV), the method comprising:
   determining whether a Tele-Operated driving (TOD) operation of the AV is required for operating the AV in a current traffic condition; and
   in response to determining that a tele-operated driving TOD operation of the AV is required for operating the AV in a current traffic condition, transmitting a TOD message to at least one other receiver in a vicinity of the AV requiring the TOD operation to control an AV requiring a TOD operation, the TOD message comprising information indicating that TOD operation is required by the AV, wherein the at least one other receiver is a receiver other than a control center in communication with the AV, wherein the determination of whether tele-operated driving TOD operation of the AV is required for operating the AV in the current traffic condition includes determining a traffic condition in a vicinity of the AV based on at least one detected environmental signal representative of the vicinity of the AV, and determining whether operation of the AV by an automatic driving module of the AV is prohibited in the determined traffic condition of the AV vicinity, and wherein TOD session information is extracted from TOD messages received by the AV for use in establishing a TOD session for the AV, or adjusting driving of the AV based on the extracted information.

12. The method of claim 11, further comprising:
transmitting a TOD request message to the control center for requesting a TOD operation based on determining that a TOD operation is required, wherein the TOD request message comprises information on the current traffic condition.

13. The method of claim 12, further comprising:
initiating a TOD session with the control center;
allowing the control center to control the AV;
receiving further data from the control center on the current traffic condition; and
updating the TOD message transmitted by the AV to other receivers based on said further data.

14. The method of claim 13, wherein updating the TOD message comprises adding information about at least one maneuver that enables the AV to arrive in a state, wherein an operation of the AV by an automatic driving module of the AV is feasible.

15. The method of claim 14, wherein the information about at least one maneuver is inferred from the driving of the transportation vehicle under control of the control center.

16. The method of claim 14, wherein the information on at least one maneuver is derived from the further data received from the control center.

17. The method of claim 14, wherein the information on at least one maneuver is a driving path.

18. The method of claim 11, wherein the TOD message comprises a timestamp, an identifier of the AV, and a geolocation of the AV.

19. The method of claim 13, wherein the TOD message further comprises:
information indicating whether the AV is in a TOD operation;
an identifier of the control center obtained from the further data; and/or
an expected duration of the TOD session obtained from the further data.

20. The method of claim 12, wherein prior to the transmitting of a TOD request message, the method further comprises:
receiving a TOD message from another AV;
extracting from the TOD message information on a TOD session of the another AV; and
utilizing the extracted information to establish the TOD session, or adjust driving of the AV based on the extracted information.

21. A method for operating an Automatic transportation Vehicle AV, the method comprising:

determining whether a Tele-Operated Driving (TOD) operation of another AV is required by receiving a TOD message from the another AV via at least one receiver, wherein the at least one receiver is a receiver other than a control center; and adapting automatic driving operation of the AV and/or outputting a signal to an AV's occupant in response to the determination, wherein the determining whether TOD operation of the another AV is required is based on the TOD message from the another AV indicating that TOD operation is required for operating the another AV in a current traffic condition, wherein the determination whether TOD operation of the another AV is required for the current traffic condition is based on a determination of a traffic condition in a vicinity of the AV based on at least one detected environmental signal representative of the vicinity of the AV, and a determination of whether operation of the AV by an automatic driving module of the AV is prohibited in the determined traffic condition of the AV vicinity, and wherein TOD session information is extracted from TOD messages received by the AV for use in establishing a TOD session for the AV, or adjusting driving of the AV based on the extracted information.

22. The method of claim 21, further comprising:
extracting, from the TOD message, information on a TOD session of the another AV;
utilizing the extracted information when establishing a TOD session and/or when adapting automatic driving operation of the AV.

23. A non-transitory computer readable medium storing computer-executable instructions performing the computer-implemented method for operating an Automatic transportation Vehicle (AV) when the instructions are executed on a computer, the method comprising:
determining whether a Tele-Operated driving (TOD) operation of the AV is required for operating the AV in a current traffic condition; and
in response to determining that a tele-operated driving TOD operation of the AV is required for operating the AV in a current traffic condition, transmitting a TOD message to at least one other receiver in a vicinity of the AV requiring the TOD operation to control an AV requiring a TOD operation, the TOD message comprising information indicating that TOD operation is required by the AV, wherein the at least one other receiver is a receiver other than a control center, wherein the determination of whether tele-operated driving TOD operation of the AV is required for operating the AV in the current traffic condition includes determining a traffic condition in a vicinity of the AV based on at least one detected environmental signal representative of the vicinity of the AV, and determining whether operation of the AV by an automatic driving module of the AV is prohibited in the determined traffic condition of the AV vicinity, and wherein TOD session information is extracted from TOD messages received by the AV for use in establishing a TOD session for the AV, or adjusting driving of the AV based on the extracted information.

* * * * *